United States Patent Office.

ALFRED A. CONSTANTINE, OF NEW PROVIDENCE, NEW JERSEY.

Letters Patent No. 62,820, dated March 12, 1867.

---

IMPROVEMENT IN THE MANUFACTURE OF SOAP.

---

*The Schedule referred to in these Letters Patent and making part of the same.*

---

TO ALL WHOM IT MAY CONCERN:

Be it known that I, ALFRED A. CONSTANTINE, of New Providence, in the county of Union, in the State of New Jersey, have invented a new and useful Process for Manufacturing Pine Tar into a perfect Soap or Soaps.

The medicinal virtues of pine tar, in its application to almost all diseases, are too well known to need comment here. Used in the form of a perfect soap, I am enabled to obtain the medicinal benefits of the pine tar in a form at once agreeable and convenient for use; while, by its combination and formation into perfect soaps, its tonic, healing, soothing, and cleansing effects are largely increased.

The nature of my invention consists in combining pine tar into soap, as hereinafter described.

First, I take two hundred pounds of tallow, and two hundred pounds of lye, ten degrees strong. These I put into the kettle, and boil one to two hours. If not strong enough, add a little more lye. If too strong, weaken it by adding water till it comes to the proper consistency, which will be known by its dropping from a knife in stringy flakes, "leather-apron" like, which every soap-maker understands. Then I add about fifteen pounds of salt, stir and boil ten or fifteen minutes; then I dip it out, and let it settle one to two hours. Second change: I now put into the kettle thirty pounds of lye, eighteen degrees strong, dip in the soap, add twenty-five pounds of palm oil, and fifty pounds of rosin, pulverized; stir till dissolved. I now boil it two and a half to three hours, adding more lye, eighteen degrees strong, till it comes to the proper consistency. If too strong, add water. Then dip it out and settle again. Third change: I put into the kettle thirty pounds of lye, eighteen degrees strong; then I put in twenty pounds pine tar, dip in the soap, and boil about two hours, adding more lye till it comes to the same consistency as in the first change. If too curdly, reduce by adding weak lye, if not curdly, add more lye, eighteen degrees strong, till it leather-aprons like the first change. Then I add about ten pounds of salt, and boil ten minutes, dip it out and settle. I then put into the kettle thirty pounds of lye, twelve degrees strong, and dip in the soap, and boil it slow one to three hours, adding lye or water to bring it to the "leather-apron" consistency. Then I let it stand in the kettle about four hours, when I dip the soap into the forms. As soon as the soap is in the form to overcome effectually the specific gravity of the pine tar and make it saponify perfectly, I have three pounds sal soda dissolved in two pounds of water, and three pounds of cocoa-nut oil melted, which I crutch into the soap immediately. I then add three and a half pounds of borax dissolved in three and a half pounds of water, and mix it in thoroughly; then, immediately, put in four and a half pounds of ammonia. This well mixed, I add three pounds of citronella, and eight ounces each of oil of cloves and cinnamon, at a temperature of about 80°. I now let it remain in the form four days, when it will be perfectly saponified and ready to cut into bars.

What I claim is—

The use of pine tar, in its combinations with soap or soaps, and in the manufacture of soap or soaps, substantially as described.

I also claim, as a new article of manufacture, soap made with pine tar as one of its ingredients.

ALFRED A. CONSTANTINE.

Witnesses:
T. C. CONNOLLY,
HENRY T. MUNSON.